Aug. 19, 1924.                                                              1,505,626
G. H. L. DEBAECKER
SUCTION DEVICE FOR LIFTING AND TRANSPORTING ARTICLES HAVING ANY KIND OF SURFACE
Filed Dec. 11, 1923                3 Sheets-Sheet 2
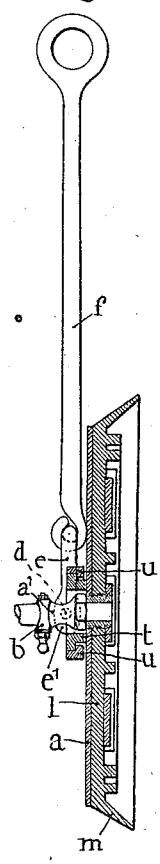
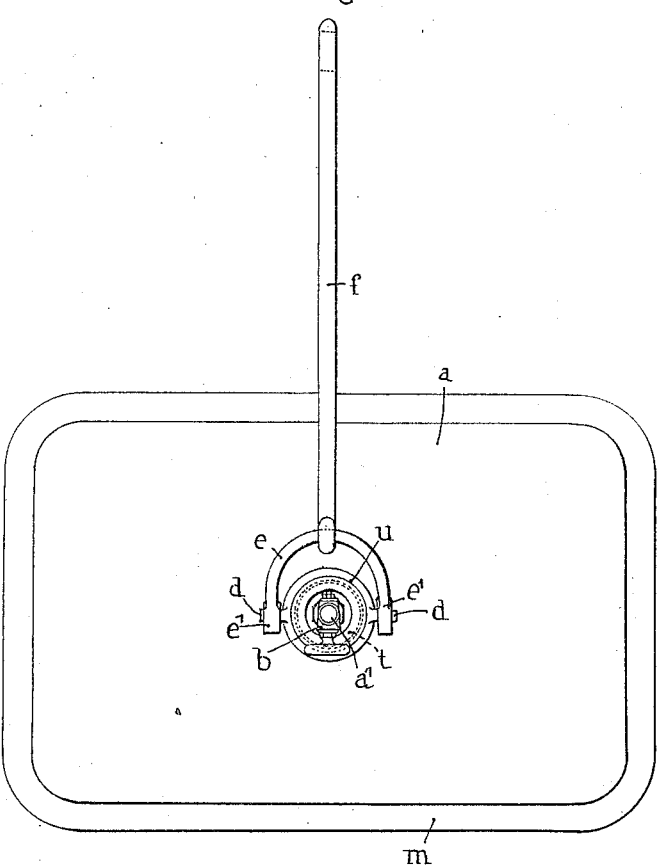
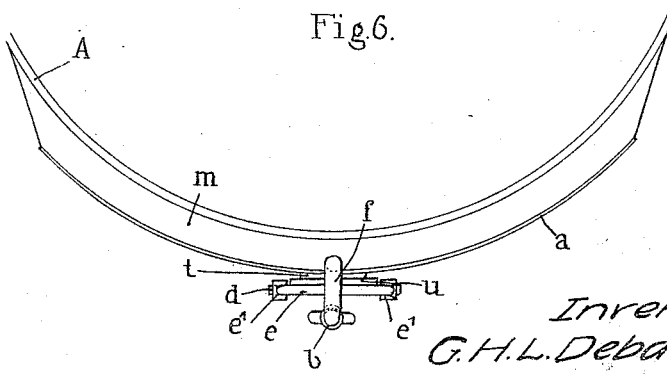
Inventor
G. H. L. Debaecker

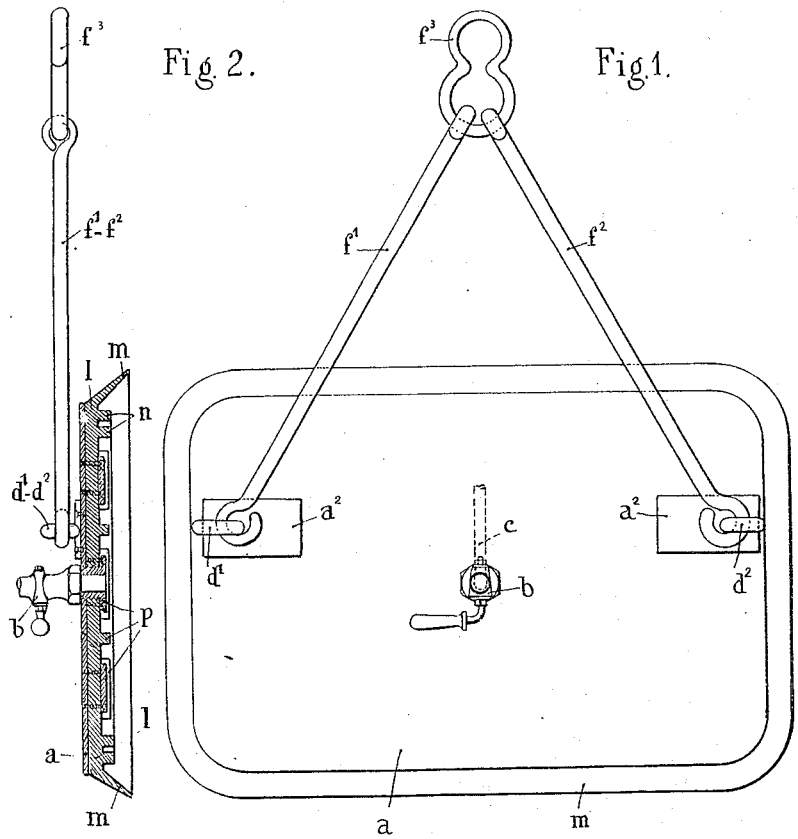
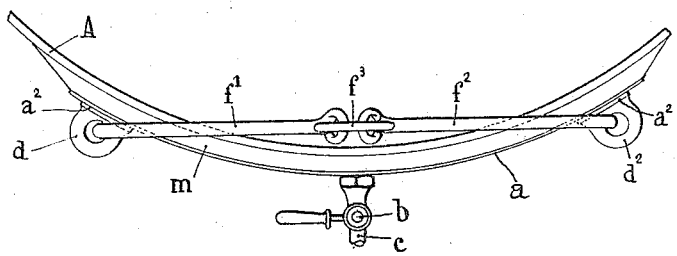

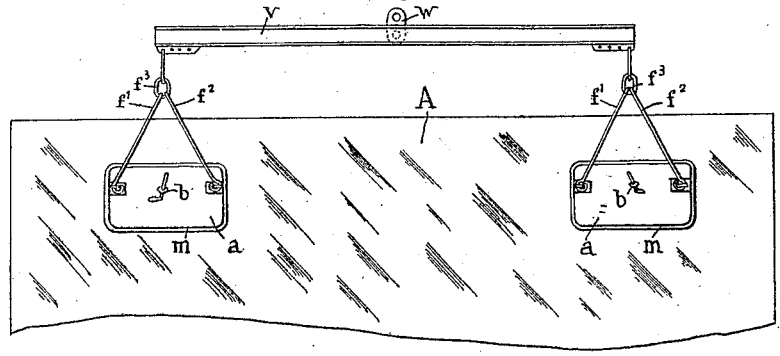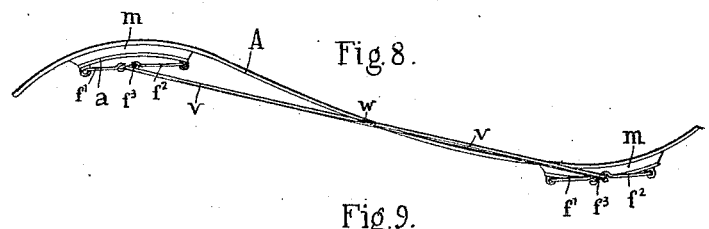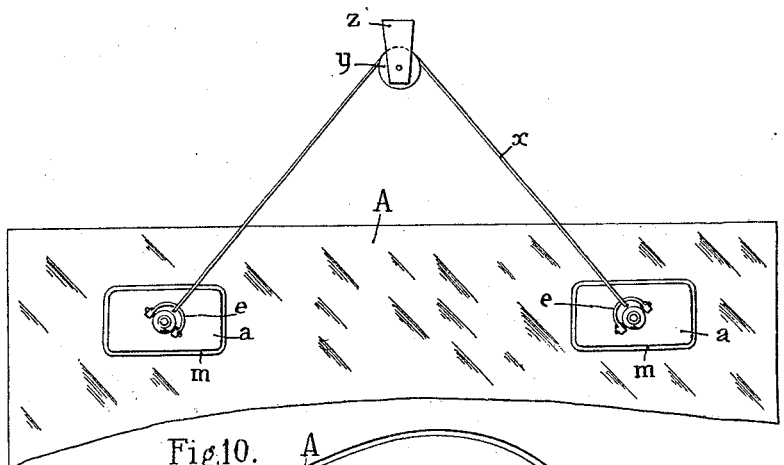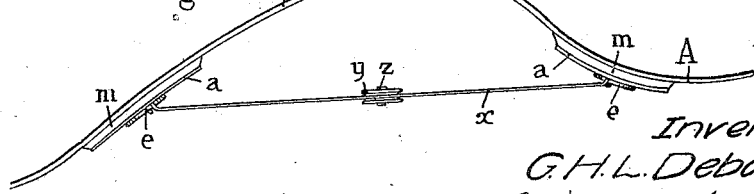

Patented Aug. 19, 1924.

1,505,626

UNITED STATES PATENT OFFICE.

GEORGES HENRI LÉON DEBAECKER, OF SAS-DE-GAND, NETHERLANDS, ASSIGNOR TO SOCIÉTÉ DITE MANUFACTURES DES GLACES & PRODUITS CHIMIQUES DE ST. GOBAIN, CHAUNY & CIREY, OF PARIS, FRANCE, A CORPORATION OF FRANCE.

SUCTION DEVICE FOR LIFTING AND TRANSPORTING ARTICLES HAVING ANY KIND OF SURFACE.

Application filed December 11, 1923. Serial No. 680,005.

To all whom it may concern:

Be it known that I, GEORGES HENRI LÉON DEBAECKER, citizen of the French Republic, residing at Sas-de-Gand, Netherlands, have invented certain new and useful Improvements in Suction Devices for Lifting and Transporting Articles Having Any Kind of Surface, of which the following is a specification.

In my application for Letters Patent filed in the United States on November 13, 1923, Ser. 674,568, for "suction device for lifting and transporting articles, more particularly sheets or slabs of glass, metal and other materials", I have described a suction device for the lifting and transporting of articles of which the surface comprises at least one part more or less flat; the suction device was composed of a single and continuous sheet of rubber or caoutchouc secured to a backing in the form of a plate which was connected by suspension devices to a hoisting apparatus, and connected at its centre to a flexible pipe furnished with a multiple-way cock which allowed the suction device to be put in communication either with the atmosphere or with a vacuum reservoir or suction apparatus.

My present invention has for its object a construction of suction device more particularly intended for the lifting and transporting of articles having a curved, spherical or cylindrical surface or in general any surface other than plane.

For this purpose, the backing or support for the sheet of rubber is made of flexible material such as thin sheet metal, leather or the like, in such a way that by altering its shape it will allow the rubber sheet to conform to and be properly applied to, the surface of the article to be lifted.

If the surface of the article to be lifted or transported is particularly large, or of a shape difficult to be engaged at a single place, the lifting and transporting can be effected by the help of two or more suction devices each formed as the single suction device above mentioned and connected to the hook or tackle of the hoisting apparatus by any suitable arrangement which allows the suction devices to be moved apart or brought closer together, according to the positions at which it is convenient to attach them to the article to be lifted.

The annexed drawings represent, as examples, various ways of carrying out the invention.

Figure 1 is a rear elevation of a first form of construction of the suction device.

Figure 2 is a transverse vertical sectional view through one of the axes of the suction device.

Figure 3 is a plan view thereof.

Figures 4, 5 and 6 are corresponding views of a modification.

Figures 7 and 8 are a view in rear elevation and a plan view respectively, showing one method of grouping two suction devices according to Figures 1 to 3, for the lifting of an article of large dimensions.

Figures 9 and 10 are corresponding views of another method of grouping two suction devices according to Figures 4 to 6.

In these different forms of construction, the suction device is of the kind described and shown in my application for United States Letters Patent mentioned above, the sheet of rubber $l$ is secured upon the supporting backing $a$, to the central portion of which is screwed a union furnished with a three-way cock $b$ controlling a flexible pipe $c$ and enabling the suction device to be put in communication either with the vacuum reservoir or suction apparatus (not shown), or with the atmosphere. The sheet of rubber $l$ comprises a flexible peripheral lip $m$ intended to be applied against the surface of the article to be lifted; within this lip are provided peripheral crowns $n$ $n$ which project or outstand from the sheet to a less extent than the lip $m$, and inside these crowns $n$, bars or ribs $p$ slightly to the rear or below the height of the crowns and spaced from the latter and from one another, these crowns $n$ and these bars or ribs being intended to limit the flattening of the sheet of rubber upon the article to be raised and transported, and to facilitate the circulation of air within the suction device.

It is to be understood that the suction device might nevertheless be of any other suitable construction, provided that it is composed of an uninterrupted sheet of any suitable flexible material capable of being applied exactly upon, and adhering to, the surface of the article to be lifted, this sheet being mounted on a supporting backing connected to the vacuum apparatus and provided with means for its suspension from the hoisting apparatus.

In accordance with the invention, the supporting backing $a$ is formed of a flexible material such as thin sheet metal, reinforced at $a^2$ $a^2$ at the points to which hooks $d^1$ $d^2$ are attached, to which hooks are secured rods or wires $f^1$ $f^2$ jointed to a ring or loop $f^3$ intended to be engaged by the hook of the hoisting tackle or other hoisting apparatus (not shown).

By reason of this arrangement, the backing $a$ can alter its shape together with the rubber sheet $l$, and thus allow the latter to conform to and be applied to the surface of the article A to be lifted, such article having a curved shape (see Figure 3), and to adhere suitably thereto.

The form of carrying out the invention shown in Figures 4 to 6, differs from the first one in that the supporting backing $a$ comprises a single central affixture $t$ through the centre of which there passes the union $a^1$ furnished with the three-way cock $b$; this affixture $t$ can turn in a collar $u$ which is provided with two diametrically opposite trunnions $d$ which are engaged by the fork arms $e^1$ of a stirrup or hanger $e$ carried by the suspensory wire or rod $f$ of the hoisting tackle.

By reason of this method of attachment, the suction device can be affixed to the article to be lifted, at a position affording any desired degree of orientation in relation to the vertical.

The suspensory arrangements described and shown might obviously be replaced by any other combination of jointed parts allowing its full flexibility to the backing which serves as a support for the suction device.

Figures 7 and 8 show a method of grouping two suction devices, suspended, in the manner indicated in Figures 1 to 3, from any two points, variable as may be desired, upon a two-armed lever or beam $v$, of which the central ring $w$ or pivotal axis is engaged by the hook of the hoisting tackle or other hoisting device.

Figures 9 and 10 show another method of grouping two suction devices, suspended, as in the arrangement of Figures 4 to 6 by stirrups $e$ at the extremities of a cable $x$ passing over a pulley $y$ of which the block $z$ is carried by the hoisting device. By this grouping of two or more suction devices according to the invention, articles of large dimensions and presenting any surface other than flat or plane can be lifted and transported.

It is to be understood that these forms of carrying out the invention have been given only by way of examples and that numerous modifications can be made therein without departing from the spirit of the invention.

What I claim is:

1. A suction device for lifting and transporting articles with any kind of surface, comprising a carrier and backing plate, a continuous sheet of flexible material, adapted to adhere under a vacuum to the surface of said article, fastened to said plate, a hoisting apparatus, means for securing the carrier and backing plate to the same, a piping connected to the suction device through the carrier plate, and means upon said piping for controlling the communication of the suction device with the atmosphere and with a vacuum producing means, the carrier and backing plate being made of a flexible material adapted to conform to and be applied exactly upon the surface of the article to be lifted and transported.

2. A suction device for lifting and transporting articles, with any kind of surface, comprising a carrier and backing plate, a continuous sheet of rubber fastened to said plate, a hoisting apparatus, means for securing the carrier and backing plate to the same, a piping connected to the suction device through the carrier plate, and means upon said piping for controlling the communication of the suction device with the atmosphere and with a vacuum producing means, the carrier and backing plate being made of thin sheet metal adapted to conform to and be applied exactly upon the surface of the article to be lifted and transported.

3. A suction device for lifting and transporting articles with any kind of surface, comprising a carrier and backing plate, a continuous sheet of flexible material, adapted to adhere under a vacuum to the surface of said article, fastened to said plate, a hoisting apparatus, suspensory means loosely connecting the carrier and backing plate to the same, a piping connected to the suction device through the carrier plate, and means upon said piping for controlling the communication of the suction device with the atmosphere and with a vacuum producing means, the carrier and backing plate being made of a flexible material adapted to conform to and be applied exactly upon the surface of the article to be lifted and transported.

4. A suction device for lifting and transporting articles, with any kind of surface, comprising a carrier and backing plate, a continuous sheet of flexible material, adapted to adhere under a vacuum to the surface of said article, fastened to said plate, a hoisting apparatus, a member secured to the central part of the backing plate, a collar adapted to turn upon said securing member, and suspensory members connecting said collar to the hoisting apparatus, a piping connected to the suction device through the carrier plate, and means upon said piping for controlling the communication of the suction device with the atmosphere and with a vacuum producing means, the carrier and backing plate being made of a flexible material adapted to conform to and be applied exactly upon the surface of the article to be lifted and transported.

5. An apparatus for lifting and transporting articles with any kind of surface, comprising a plurality of suction devices,—each of them comprising a carrier and backing plate of flexible material, adapted to conform to and be applied exactly upon the surface of the article, and comprising a continuous sheet of flexible material, adapted to adhere under a vacuum to the surface of said article, fastened to said carrier and backing plate, a piping connected to each suction device through the carrier plate, and means upon said piping for controlling the communication of the suction device with the atmosphere and with a vacuum producing means, a common hoisting apparatus, and suspensory means loosely connecting each carrier and backing plate to the said hoisting apparatus.

6. An apparatus for lifting and transporting articles with any kind of surface, comprising a plurality of suction devices,— each of them comprising a carrier and backing plate of flexible material adapted to conform to and be applied exactly upon the surface of the article, and comprising a continuous sheet of flexible material, adapted to adhere under a vacuum to the surface of said article, fastened to said carrier and backing plate, a piping connected to each suction device through the carrier plate, and means upon said piping for controlling the communication of the suction device with the atmosphere and with a vacuum producing means, a common hoisting apparatus, a member secured to the central part of each carrier and backing plate, a collar adapted to turn upon said securing member, and suspensory members connecting said collars to the said hoisting apparatus.

7. An apparatus for lifting and transporting articles with any kind of surface, comprising a plurality of suction devices,—each of them comprising a carrier and backing plate of flexible material adapted to conform to and be applied exactly upon the surface of the article, and comprising a continuous sheet of flexible material, adapted to adhere under a vacuum to the surface of said article, fastened to said carrier and backing plate, a piping connected to each suction device through the carrier plate, and means upon said piping for controlling the communication of the suction device with the atmosphere and with a vacuum producing means, a common hoisting apparatus, a member secured to the central part of each carrier and backing plate, a collar adapted to turn upon said securing member, a pulley the block of which is carried by the hoisting apparatus, and a cable passing over said pulley and secured at its ends to the collars, for the purpose described.

In testimony whereof I have signed my name to this specification.

GEORGES HENRI LÉON DEBAECKER.

Witnesses:
KNOWLTON V. HICKS,
A. W. WETZEL.